Feb. 26, 1935. J. M. WEED 1,992,792
WELDING ELECTRODE
Filed Jan. 28, 1932
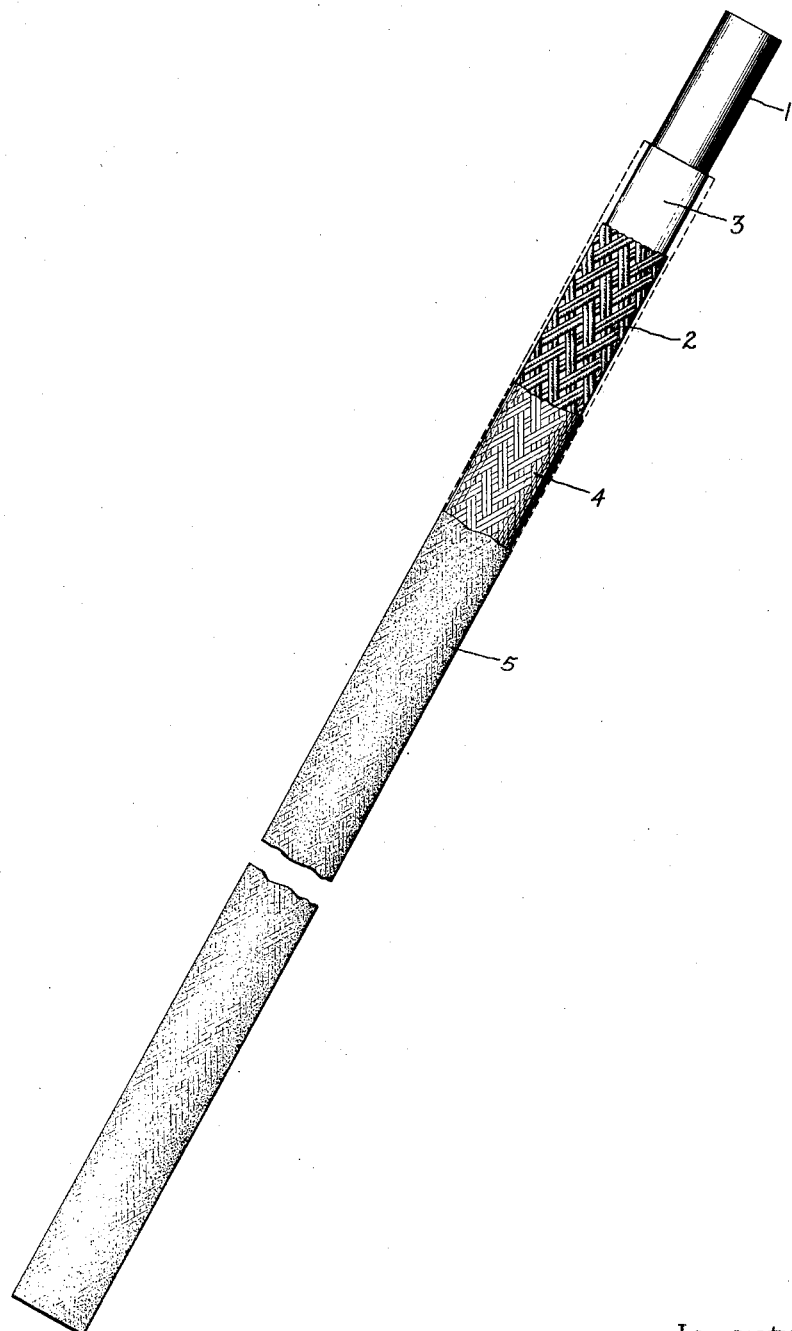
Inventor:
James M. Weed
by Charles O. Tullar
His Attorney.

Patented Feb. 26, 1935

1,992,792

UNITED STATES PATENT OFFICE 1,992,792

WELDING ELECTRODE

James M. Weed, Ballston Lake, N. Y., assignor to General Electric Company, a corporation of New York Application January 28, 1932, Serial No. 589,386

14 Claims. (Cl. 219—8)

My invention relates to welding electrodes particularly suited for metallic arc welding.

In metallic arc welding the weld is produced through the agency of an arc established between the work and a metal rod or pencil commonly referred to as an electrode. By associating certain materials with the electrode as a core or coating, the operating characteristics of the arc and the quality of the weld metal are greatly improved. Such materials are referred to as fluxes.

It is an object of my invention to provide a fluxed electrode for producing sound ductile welds of high tensile strength.

It is a further object of my invention to provide an electrode having a high melting rate which makes rapid welding speeds possible.

It is a further object of my invention to provide an electrode from which metal of exceptional fluidity is deposited making it possible to produce flat smooth welds.

It is a further object of my invention to provide a welding flux which not only facilitates the welding operation and the deposition of weld metal, but which after deposition on the work as a slag may also be easily separated from the weld at the completion of the welding operation, thus facilitating the deposition of a plurality of layers of weld metal one on top of another, as is necessary when welding parts of considerable thickness.

Further objects of my invention will become apparent from a consideration of the following description taken in connection with the accompanying drawing which illustrates one embodiment thereof.

The electrode illustrated in the drawing comprises a metallic rod 1 provided with a covering of cellulosic material 2 filled with a material of the following composition:—titanium dioxide, 0 to 1 part by weight; talc, 0 to 1 part by weight; feldspar, 1 part by weight; and sodium silicate (liquid), about the same weight as the combined weight of the above ingredients. The titanium dioxide, talc and feldspar are preferably in powdered form and when mixed with the sodium silicate form a paste which may be diluted with water if necessary to produce the proper consistency for adhesion to the rod and cellulosic material. I prefer to employ a potassium feldspar and to apply the flux to an undrawn, unpickled rod which has been mechanically cleaned. Although the flux may be applied to wire drawn from a rod by the usual processes of manufacture, I find that by employing an undrawn, unpickled, mechanically cleaned rod improved results are obtained. The sodium silicate acts as a binder and the amount employed in my flux may vary through rather wide limits without noticeably affecting the operation of the welding arc or the characteristics of the deposited metal. I have employed a sodium silicate with a specific gravity of 41° Baumé and the following percentage of solid matter: $Na_2O$, 8.9 per cent and $SiO_2$, 29 per cent.

The coating may be applied to the electrode as follows: A thin coating 3 of the above paste is first applied to the rod 1 by passing it through a bath of the same and controlling the thickness of the coating by passing the rod as it emerges from the bath through a die, the size of the opening in the die being such as to produce a coating of the desired thickness. The cellulosic material employed in the electrode illustrated is in the form of cotton yarn which is braided about the electrode embedding itself in the initial coating 3. The electrode is then passed through a second bath of the above paste which is rubbed into the braid completely filling all its interstices. In passing from this second coating bath it is preferably passed through a die or equivalent mechanism by means of which excess paste is removed and thickness of the flux limited to approximately the thickness of the braid. By applying the coating in this manner the thickness of the coating is rendered uniform and the arcing characteristics of the electrode are improved. The appearance of the electrode is then substantially as illustrated at 4. A drying powder 5 may then be applied to the electrode for drying or setting the outer layer of flux, so that it will not rub off, and so that the electrodes will not stick to one another or to the container in which they are placed for handling or shipping.

The composition of the filling material, it will be noted, may be varied considerably. A filling material of feldspar and sodium silicate is very satisfactory, except for the fact that this material, when deposited upon the weld as a molten slag, has a tendency to gather into globular or disc like masses which produce depressions in the surface of the weld metal in the bottoms of which pits or pipes are often found. The addition of either titanium dioxide or talc renders the slag more fluid and causes it to spread over the surface of the weld giving a better protection to the weld metal and leaving a smooth surface after the slag is removed. I am presently using a filling material of substantially the following composition:

|                          | Parts by weight |
|--------------------------|:---:|
| Titanium dioxide         | 1 |
| Talc                     | 1 |
| Feldspar                 | 1 |
| Sodium silicate (liquid) | 3 |

Additions may be made to the filling material in the form of metallic elements having particular affinities at high temperatures for oxygen and nitrogen, to assist in protecting the molten metal of the electrode and of the weld. Such additions may be aluminum, zinc, vanadium, titanium, silicon, manganese and the like. The limit to the addition of these ingredients is determined by their tendency to be incorporated in the weld metal. This limit will be quite different for the different metals since the effect of relatively small amounts of aluminum or zinc in the weld metal would be detrimental whereas larger amounts of vanadium, titanium and silicon and a still larger amount of manganese might be desirable depending on the characteristics desired in the weld.

The drying powder when using sodium silicate in the flux paste may be either sodium bicarbonate or a mixture of this material with the powder constituents of the paste which is being used. I am presently employing a drying powder of the following composition:

|                     | Parts by weight |
|---------------------|:---:|
| Titanium dioxide    | 1 |
| Talc                | 1 |
| Feldspar            | 1 |
| Sodium bicarbonate  | 1 |

These drying powders set the paste by coagulating the sodium silicate therein.

The braid used in coating electrodes in accordance with my invention acts as a binder holding the remainder of the fluxing material firmly in place thereon until the heat of the arc burns it away. The thickness of the coating is governed by the thickness of the braid and is therefore uniform. The material with which the braid is filled prevents it from burning back from the tip of the electrode and produces a protecting sleeve which projects beyond the melting tip of the metallic core. This projecting sleeve together with the neutral atmosphere produced by the burning yarn protects the electrode metal from atmospheric action while passing through the arc. The deposited metal is protected while cooling by a covering of molten slag produced by the fused electrode flux. This slag spreads over the surface of the weld and remains in a liquid condition until after the metal has solidified giving a smooth even surface to the deposited metal. Upon cooling it cracks loose from the metal and is easily removed therefrom.

The slight projection of the flux coating beyond the tip of the electrode results in a higher voltage across the arc than attained with bare electrodes. The voltage varying from about 25 volts for a short arc with low current values to 35 or 40 volts for a longer arc with heavy current values. Since the total heat of the arc is proportional to the product of amperes and volts, this higher arc voltage results in a corresponding increase in the heat produced with a given value of welding current. The melting rate of the electrode is increased, the penetration of the weld is greater and the molten metal in the pool is hotter and, consequently, more fluid because of the higher voltage characteristic of my improved electrode. This results in flatter smoother welds and in greatly increased speeds of welding due both to the faster melting of the electrode and the work and to the more efficient use of the electrode material.

I prefer to apply comparatively thick coatings of my fluxing material. For a quarter inch diameter electrode I apply an initial coating of about .015 to .020 of an inch in thickness and a braided coating of a thickness of about .040 to .050 inch. Thicker coatings may be employed and because of their effect in increasing the arc voltage and fluidity of the weld metal are often to be preferred.

My electrode may be used with straight or reversed polarity; that is, it may be connected to the negative terminal of the source of supply or to the positive terminal thereof. With the higher current values needed to obtain the maximum advantage of increased speed of welding, smoother operation is obtained with reversed polarity; that is, with the electrode positive and the work negative. With the higher current values pronounced spattering develops when using straight polarity but with reversed polarity the higher the current density the smoother the operation. In cases where it is not convenient to use reversed polarity, good operation can be obtained with straight polarity using lower current values. When operating in this manner the advantages of strength and toughness of the weld will still be retained but the speed of welding will be reduced.

With reversed polarity and coatings of substantial thickness the metal deposited when using high current values is of high fluidity making it desirable to place the work in a horizontal position prior to welding. For vertical and overhead welding, however, it is necessary to use reduced current values with straight polarity. It is also desirable under these conditions to use a thinner flux coating on the electrode than is used for flat or horizontal welding. With thick coatings a projecting sleeve is obtained which causes the metal to become superheated, giving it the fluidity desired for rapid horizontal welding, but which renders it unsuited for vertical or overhead welding because of its tendency to run down from the place where it is being deposited.

Welding electrodes according to my invention may be produced in short lengths with one end thereof bared for use in hand welding, or in long lengths for use in automatic or semi-automatic welding machines. In hand welding the bared portion of the electrode is inserted in an electrode holder and the welding operation performed by an operator who feeds it toward the work in accordance with its consumption in the arc. In automatic arc welding the electrode is fed toward and away from the work to strike and thereafter maintain a welding arc by means of a mechanism that functions in response to a characteristic of the welding arc such as its voltage or current. In such automatic machines current is supplied to the electrode through incisions made in the coating, or by removing a portion of the coating and feeding current to the electrode through the portions of the electrode thus bared.

Although the filling material above referred to may be used alone as a flux, best results are obtained when using it with a cellulosic material. The cellulosic material may be applied to the electrode in any convenient manner although I prefer to apply it as a textile. In place of the braided covering above described other arrangements may be employed such as winding about the electrode one or more strands of yarn or a strip of cloth or gauze made therefrom. The drying powder above referred to is used principally to expedite the manufacturing process and is not a necessary element of my invention. My invention is not limited to applying the fluxing material as a coating on the outside of an electrode, since beneficial results may also be obtained by placing it within the electrode or in pockets within the same.

What I claim as new and desire to secure by Letters Patent of the United States, is:

1. An electrode having a surface coating consisting substantially entirely of feldspar and a binder.

2. A flux for use in arc welding consisting substantially entirely of cellulosic material impregnated with feldspar.

3. A flux for use in arc welding comprising a cellulosic material impregnated with substantially equal parts by weight of feldspar and liquid sodium silicate.

4. A flux for use in arc welding having substantially the following composition: titanium dioxide, up to 1 part by weight; talc, up to 1 part by weight, and feldspar, 1 part by weight.

5. An electrode having a flux coating of substantially the following composition: titanium dioxide, up to 1 part by weight; talc, up to 1 part by weight, feldspar, 1 part by weight and a binder.

6. An electrode having a flux coating of substantially the following composition: titanium dioxide, up to 1 part by weight; talc, up to 1 part by weight; feldspar, 1 part by weight, and liquid sodium silicate of substantially the same weight as the combined weight of the preceding ingredients.

7. A flux for use in arc welding comprising a cellulosic material impregnated with a filling material of substantially the following composition: titanium dioxide, up to 1 part by weight; talc, up to 1 part by weight, feldspar, 1 part by weight; and liquid sodium silicate of substantially the same weight as the combined weight of the preceding ingredients.

8. A flux for use in arc welding comprising a cellulosic material impregnated with a filling material of substantially the following composition: titanium dioxide 1 part by weight; talc, 1 part by weight; feldspar, 1 part by weight, and liquid sodium silicate, 3 parts by weight.

9. An electrode for use in arc welding having a surface coating of cotton textile material impregnated with a filling material of substantially the following composition: titanium dioxide 1 part by weight; talc, 1 part by weight; feldspar, 1 part by weight, and liquid sodium silicate, 3 part by weight, to which is applied a coating of powder of substantially the following composition: titanium dioxide, 1 part by weight; talc, 1 part by weight; feldspar, 1 part by weight; and sodium bicarbonate, 1 part by weight.

10. An electrode of undrawn, unpickled rod which has been mechanically cleaned and coated with a fluxing material.

11. A positive arc welding electrode of undrawn, unpickled ferrous rod material which has been mechanically cleaned and covered with a coating of cellulosic material impregnated with a material of substantially the following composition: titanium dioxide, up to 1 part by weight; talc, up to 1 part by weight; feldspar, 1 part by weight, and a binder.

12. The method of applying a flux coating to an electrode which comprises forming a paste of the flux with liquid sodium silicate, applying said paste to the electrode and producing a substantially dry surface on said paste covered electrode by applying thereto a dry powdered material which coagulates the sodium silicate.

13. A flux for use in arc welding having substantially the following composition: titanium dioxide, up to one part by weight, and feldspar, 1 part by weight.

14. A flux for use in arc welding having substantially the following composition: talc, up to 1 part by weight, and feldspar, 1 part by weight.

JAMES M. WEED.